Jan. 27, 1931.                A. G. SIEFKER                1,790,602
SAFETY ZONE GUARD
Filed May 17, 1930
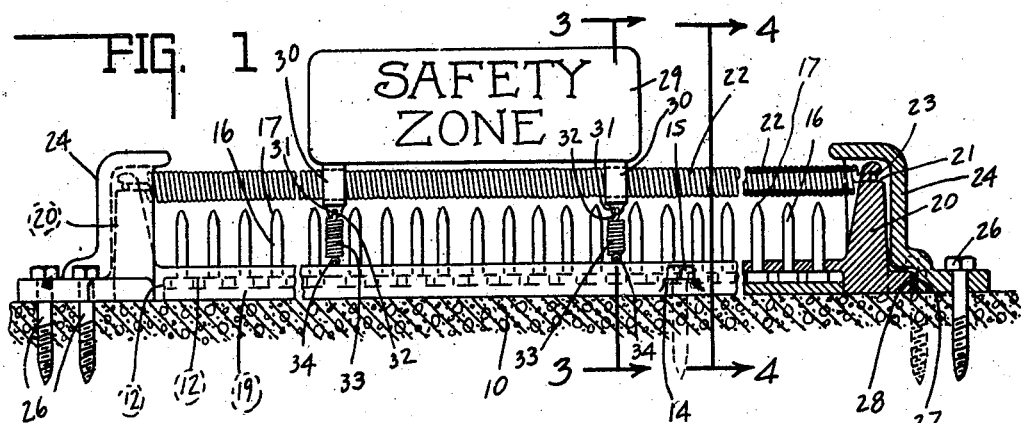
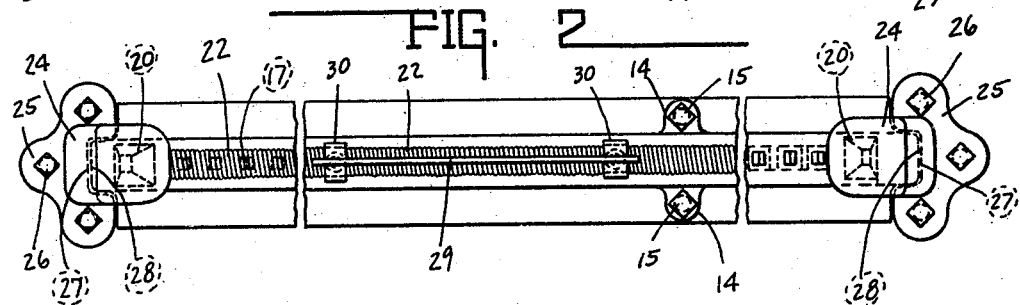
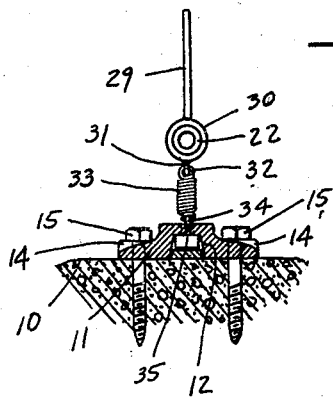
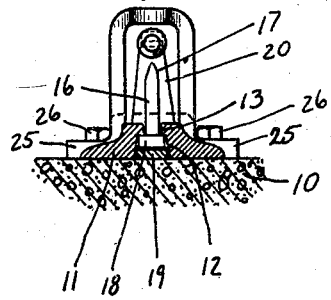
INVENTOR.
ARNO G. SIEFKER.
BY
Lockwood Lockwood Goldsmith & Galt
ATTORNEYS.

Patented Jan. 27, 1931

1,790,602

UNITED STATES PATENT OFFICE

ARNO G. SIEFKER, OF INDIANAPOLIS, INDIANA

SAFETY-ZONE GUARD

Application filed May 17, 1930. Serial No. 453,262.

This invention relates to a so-called safety zone marker.

The object of this invention is to indicate the presence of a safety zone and to automatically enforce a penalty upon the vehicle, the driver of which disregards the same and runs through it.

The chief feature of the invention consists in the provision of means for automatically bringing a vehicle, that passes through the safety zone, to a stop within a reasonable short distance thereafter, by causing deflation of a tire or tires but which is normally so protected as to cause no inconvenience or present no danger to the pedestrian or an object falling directly thereon.

The full nature of the invention will be understood from the accompanying drawings and description and claims as follows:—

In the drawings Fig. 1 is a side elevational view of one embodiment of the invention in warning position, parts being broken away and other parts being shown in section.

Fig. 2 is a top plan view thereof.

Fig. 3 is a transverse sectional view taken on line 3—3, in the direction of the arrows.

Fig. 4 is a transverse sectional view taken on line 4—4 and in the direction of the arrows.

In the drawings 10 indicates a pavement 11, a channel shaped base having a groove 12 therein, provided with a plurality of spaced slots 13. The groove 12 opens downwardly toward the pavement. If desired, the base may be provided with the bosses 14 and the anchoring lag screws or spikes 15 may be associated therewith for anchoring the base to the pavement. Extending upwardly through each of the slots 13, is the body portion 16 which terminates in the prong portion 17 which extends upwardly. The head 18 is seated in the groove and may, if desired, bear upon strap 19 that extends longitudinally the full length of the groove and may be independently anchored to the pavement or may merely bear thereon.

Extending upwardly from each end of the channel shaped base, which may be a single member or may be sectionalized, is an upright 20 and the same includes a notch or groove 21 therein. A closely coiled spring 22 constitutes a guard and the same lies immediately above the prongs 17 and normally protects the same. Any vertical pressure applied to the guard causes the same either to merely bear upon the prongs or in the event that the guard consists in the closely coiled spring, as shown, the coils will open and permit the spring to embrace the end of the prong and thus cover the prong. The arrangement is such that a lateral deformation is required to expose the prongs and this lateral deformation is obtained by the lower forward quadrant portion of the wheel of a vehicle, particularly automobiles, engaging the upper half of the coil and the force is applied downwardly and laterally and when sufficient force has been applied, the guard is removed from protecting position and the prongs become operative to deflate the tire by puncturing the same, so that the driver of the vehicle is penalized for his disregard of the traffic zone indication.

Each end of the coil spring 22 is anchored as at 23 to the upright 20. A long bar or rod may be substituted for a coil spring and yieldingly anchored at each end to accomplish the same purpose but not to as desirable a degree. An end bracket 24 constitutes a housing that guards the end, sides and top of the standard 20. The base portion 25 is suitably anchored by the bolts, spikes or lag screws 26 to the pavement. The base 25 includes a groove 27 and the base member includes a tongue 28 interlockingly associated therewith. Removability of the bracket members permits the guard construction to be readily detached from the pavement, broken spikes replaced or broken springs replaced and then reapplied.

To indicate the presence of the safety zone and likewise of the guard for warning device, there is provided a plate 29 which may be of metal, or other suitable material, or which may be of flexible rubber. Suitably supporting the same is a pair depending socket members 30, each of which encircles the guard 22. Each socket member terminates in an ear 31. The eye portion 32 of a spring 33 is secured thereto and the opposite end is secured to the eye-bolt 34 threaded into hole 35 in the base.

The terminology "prong" is intended to include any cutting member such as a semicircular upstanding plate with a tire penetrating edge.

The invention claimed is:—

1. A traffic zone guard including a supporting base for pavement or roadway anchorage, a plurality of relatively movable spaced prongs extending upwardly therefrom, and a guard normally positionable immediately above said prongs and arranged for temporary movement therefrom to expose said prongs without movement thereof and when forcibly disturbed.

2. A traffic zone guard including a supporting base for pavement or roadway anchorage, a plurality of spaced prongs extending upwardly therefrom, and a longitudinally extending closely coiled spring normally positionable immediately above the prongs and arranged for temporary movement therefrom to expose said prongs when forcibly disturbed.

3. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, and a guard normally positionable immediately above said prongs and arranged for temporary movement therefrom to expose said prongs when forcibly disturbed.

4. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a longitudinally extending closely coiled spring normally positionable immediately above said prongs and arranged for temporary movement therefrom to expose said prongs when forcibly disturbed.

5. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a strap bearing plate positionable in said groove and engageable by the heads of said prongs, and a guard normally positionable immediately above said prongs and arranged for temporary movement therefrom to expose said prongs when forcibly disturbed.

6. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a strap bearing plate positionable in said groove and engageable by the heads of said prongs, and a longitudinally extending closely coiled spring normally positionable immediately above said prongs and arranged for temporary movement therefrom to expose said prongs when forcibly disturbed.

7. A traffic zone guard including a supporting base for pavement or roadway anchorage, a plurality of spaced prongs extending upwardly therefrom, a guard normally positionable immediately above said prongs and arranged for temporary movement therefrom to expose said prongs when forcibly disturbed, said guard being anchored at opposite ends, and a protective bracket associated with each of said anchorages for protecting the same.

8. A traffic zone guard including a supporting base for pavement or roadway anchorage, a plurality of spaced prongs extending upwardly therefrom, a guard normally positionable immediately above said prongs and arranged for temporary movement therefrom to expose said prongs when forcibly disturbed, said guard being anchored at opposite ends, and a protective bracket associated with each of said anchorages for protecting the same, said base and said bracket having an interlocking connection for mutual anchorage.

9. A traffic zone guard including a supporting base for pavement or roadway anchorage, a plurality of spaced prongs extending upwardly therefrom, a longitudinally extending closely coiled guard spring normally positionable immediately above the prongs and arranged for temporary movement therefrom to expose said prongs when forcibly disturbed, said guard being anchored at opposite ends, and a protective bracket associated with each of said anchorages for protecting the same.

10. A traffic zone guard including a supporting base for pavement or roadway anchorage, a plurality of spaced prongs extending upwardly therefrom, a longitudinally extending closely coiled guard spring normally positionable immediately above the prongs and arranged for temporary movement therefrom to expose said prongs when forcibly disturbed, said guard being anchored at opposite ends, and a protective bracket associated with each of said anchorages for protecting the same, said base and said bracket having an interlocking connection for mutual anchorage.

11. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a guard normally positionable immediately above said prongs and arranged for temporary movement therefrom to expose said prongs when forcibly disturbed, said guard being anchored at opposite ends, and a protective bracket associated with each of said anchorages for protecting the same.

12. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a guard normally positionable immediately above said prongs and arranged for temporary movement therefrom to expose said prongs when forcibly disturbed, said guard being anchored at opposite ends, and a protective bracket associated with each of said anchorages for protecting the same, said base and bracket having an interlocking connection for mutual anchorage.

13. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a longitudinally extending closely coiled spring normally positionable immediately above said prongs and arranged for temporary movement therefrom to expose said prongs when forcibly disturbed, said guard being anchored at opposite ends, and a protective bracket associated with each of said anchorages for protecting the same.

14. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a longitudinally extending closely coiled spring normally positionable immediately above said prongs and arranged for temporary movement therefrom to expose said prongs when forcibly disturbed, said guard being anchored at opposite ends, and a protective bracket associated with each of said anchorages for protecting the same, said base and said bracket having an interlocking connection for mutual anchorage.

15. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a strap bearing plate positionable in said groove and engageable by the heads of said prongs, a guard normally positionable immediately above said prongs and arranged for temporary movement therefrom to expose said prongs when forcibly disturbed, said guard being anchored at opposite ends, and a protective bracket associated with each of said anchorages for protecting the same.

16. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a strap bearing plate positionable in said groove and engageable by the heads of said prongs, a guard normally positionable immediately above said prongs and arranged for temporary movement therefrom to expose said prongs when forcibly disturbed, said guard being anchored at opposite ends, and a protective bracket associated with each of said anchorages for protecting the same, said base and said bracket having an interlocking connection for mutual anchorage.

17. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a strap bearing plate positionable in said groove and engageable by the heads of said prongs, a longitudinally extending closely coiled spring normally positionable immediately above said prongs and arranged for temporary movement therefrom to expose said prongs when forcibly disturbed, said guard being anchored at opposite ends, and a protective bracket associated with each of said anchorages for protecting the same.

18. A traffic zone guard including a supporting base for pavement or roadway anchorage and having a channel shape with the groove downwardly exposed and a plurality of slots communicating with the groove, a prong in each slot and extending upwardly from the base and including a head portion seatable in the channel groove and a body portion extending through the slot, a strap bearing plate positionable in said groove and engageable by the heads of said prongs, a longitudinally extending closely coiled spring normally positionable immediately above said prongs and arranged for temporary movement therefrom to expose said prongs when forcibly disturbed, said guard being anchored at opposite ends, and a protective bracket associated with each of said anchorages for protecting the same, said base and said bracket having an interlocking connection for mutual anchorage.

19. A traffic zone guard including a supporting base for pavement or roadway anchorage, a plurality of spaced prongs extending upwardly therefrom, a guard normally positionable immediately above said prongs and arranged for temporary movement therefrom to expose said prongs when forcibly disturbed, and a legend member in juxtaposition to the guard for indicating the immediate presence of the same and the prongs, and arranged for movement independent of the guard and movable with the guard and normally returnable to indicating position when forcibly moved therefrom and released from the constraint.

In witness whereof, I have hereunto affixed my signature.

ARNO G. SIEFKER.